United States Patent [19]
Darling

[11] Patent Number: 5,236,166
[45] Date of Patent: Aug. 17, 1993

[54] BASE SUPPORT FOR A FLAG SUPPORT FOR SPRINKLER SYSTEMS ON GOLF COURSES

[76] Inventor: Gary E. Darling, P.O. Box 791, Sapulpa, Okla. 74066

[21] Appl. No.: 858,689

[22] Filed: Mar. 27, 1992

[51] Int. Cl.$^5$ .................. G09F 17/00; G09F 7/00; F16M 13/00; A63B 55/00
[52] U.S. Cl. .................. 248/519; 248/223.4; 52/103; 273/32 R; 40/618; 40/622; 40/218; 116/173; 403/381
[58] Field of Search .................. 116/173, 174, 209; 40/124.1, 124.5, 5, 218, 490, 612, 618, 622; 404/10; 248/223.4, 224.4, 225.1, 488, 519, 539; 273/32 R, 32 A, 32 H, 34 R, 176 L; 52/103, 104; 403/3, 4, 381, 361, 345, 409.1, 410

[56] References Cited

U.S. PATENT DOCUMENTS

| | | | |
|---|---|---|---|
| 2,154,966 | 4/1939 | Vanderveer | 52/103 |
| 2,604,712 | 7/1952 | Le Blanc | 40/618 |
| 2,967,366 | 1/1961 | Colbert | 40/618 |
| 2,995,849 | 8/1961 | Donnellan | 40/618 |
| 3,286,141 | 11/1966 | Raglin | 248/519 X |
| 3,289,555 | 12/1966 | Steenberg | 40/622 X |
| 3,572,707 | 3/1971 | Stapleton | 116/173 X |
| 3,650,072 | 3/1972 | Matvey | 52/103 X |
| 3,870,259 | 3/1975 | Reynolds | 248/539 |
| 4,108,439 | 8/1978 | McGuire | 273/32 R X |
| 4,150,381 | 4/1979 | Verini | 248/223.4 X |
| 4,162,132 | 7/1979 | Kress et al. | 403/361 |
| 4,489,669 | 12/1984 | Carman | 273/32 R |
| 4,574,726 | 3/1986 | Sullivan | 116/174 X |
| 4,619,125 | 10/1986 | Choi | 40/618 X |
| 4,633,215 | 12/1986 | Anders et al. | 116/173 X |
| 4,650,147 | 3/1987 | Griffin | 248/539 |
| 4,700,655 | 10/1987 | Kirby | 116/209 X |
| 4,750,450 | 6/1988 | Wiegand | 116/209 |
| 4,892,265 | 1/1990 | Cox | 248/223.4 X |
| 4,951,596 | 8/1990 | Wallace, Jr. | 40/490 X |
| 5,092,556 | 3/1992 | Darling et al. | 248/519 |

FOREIGN PATENT DOCUMENTS

| | | | |
|---|---|---|---|
| 36578 | 6/1973 | Australia | 273/32 A |
| 1407993 | 10/1975 | United Kingdom | 273/32 A |

Primary Examiner—Peter M. Cuomo
Assistant Examiner—Suzanne L. Dino
Attorney, Agent, or Firm—William S. Dorman

[57] ABSTRACT

The device is an improved base support for securing yardage indicating number inserts or a flag holder insert and an attached flag to a sprinkler unit installed on a golf course. The improved base support is secured to the sprinkler unit by means of a base. The flag insert and attached flag are installed on the base during construction of the golf course to prevent operators of heavy equipment from hitting or running over the sprinkler unit. Once the golf course is completed, the flag holder insert is removed from the base and replaced with the yardage indicating number inserts. The flag holder insert and the number inserts are provided with beveled sides and ends. The beveled sides of the flag holder insert and the beveled ends of the number inserts slide between base tracks provided on the base in order to secure the inserts to the base. The flag holder insert is removably secured to the base, while the number inserts are permanently secured to the base by means of tapered ears on the base which engage recessed holes provided in the number inserts.

6 Claims, 3 Drawing Sheets

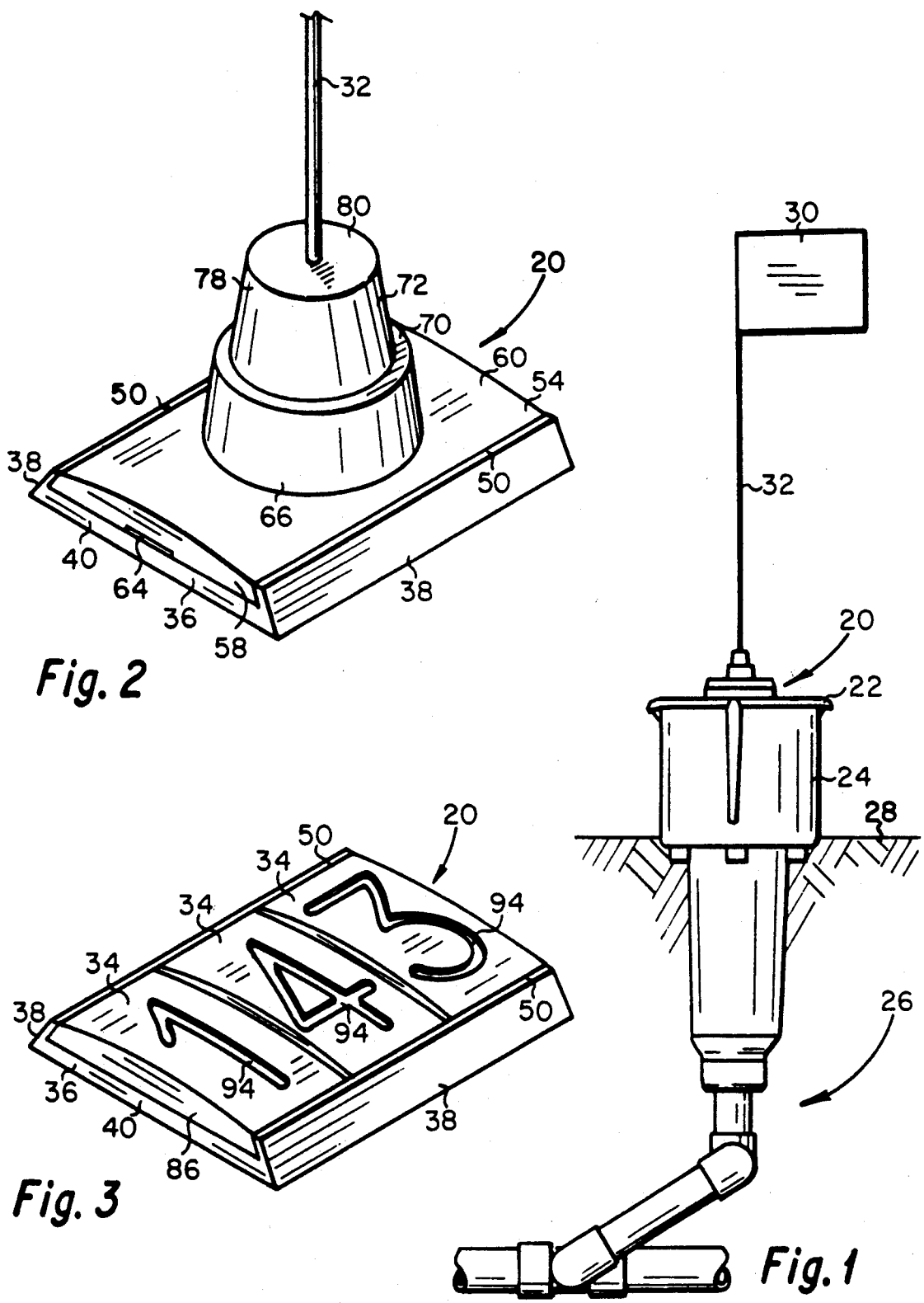

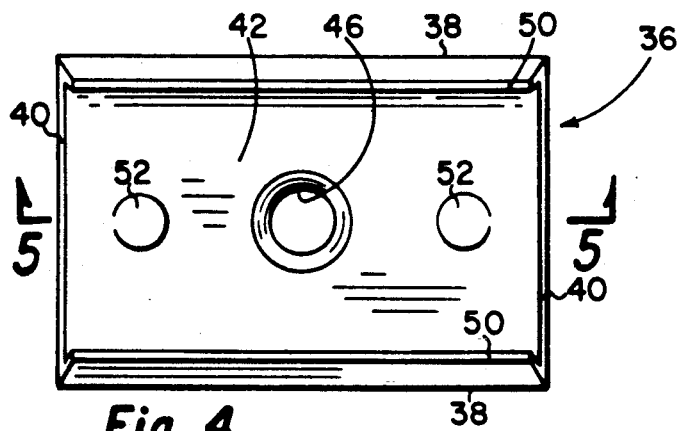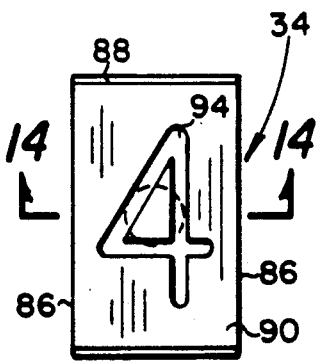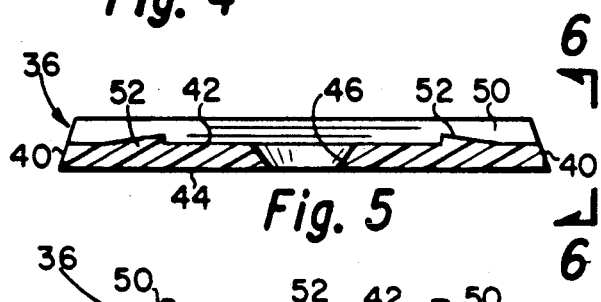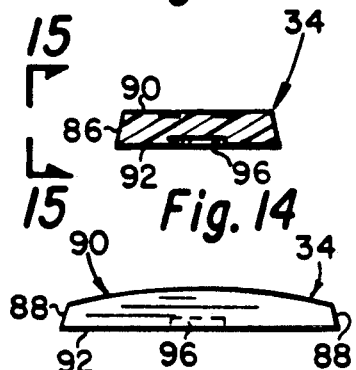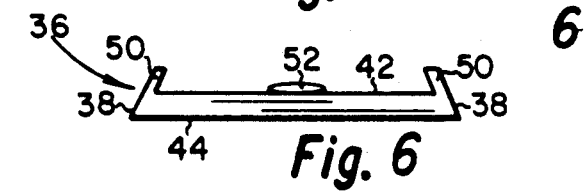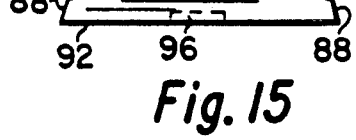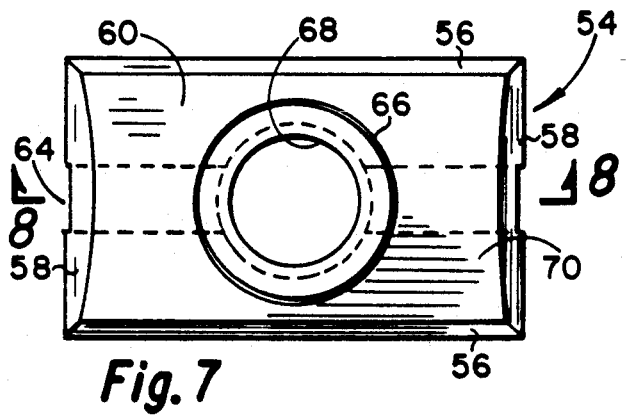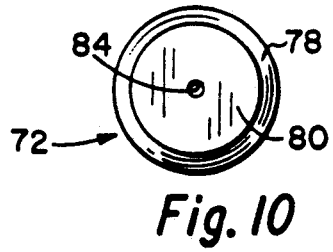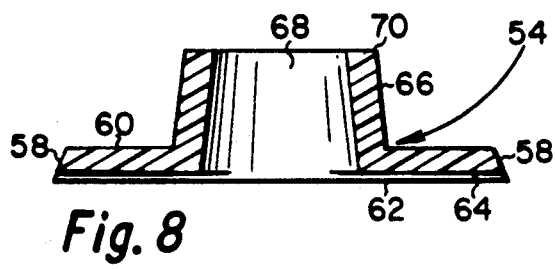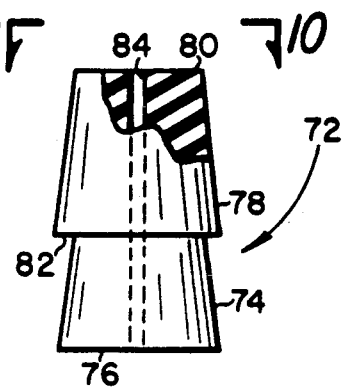

BASE SUPPORT FOR A FLAG SUPPORT FOR SPRINKLER SYSTEMS ON GOLF COURSES

BACKGROUND OF THE INVENTION

1. Field of the Invention

The present invention is an improved base support for securing flags or yardage indicating number inserts to sprinkler units located on a golf course.

2. The Prior Art

A preliminary search was conducted and the following listed U.S. patents were uncovered in the search:

| U.S. Pat. No. | Inventor | Issue Date |
|---|---|---|
| 1,778,110 | M. E. Hartzler, et al. | Oct. 14, 1930 |
| 1,913,101 | E. S. Bellows | June 6, 1933 |
| 1,915,762 | E. W. Rost | June 27, 1933 |
| 1,931,174 | G. W. Withers | Oct. 17, 1933 |
| 2,109,011 | J. J. Joyce | Feb. 22, 1938 |
| 2,598,890 | L. Cisi, et al. | June 3, 1952 |
| 2,712,809 | F. A. Clarke | July 12, 1955 |
| 4,095,788 | Benenson | June 20, 1978 |
| 4,700,655 | Kirby | Oct. 20, 1987 |
| 4,717,110 | Fohrman | Jan. 5, 1988 |
| 4,862,823 | Hughes | Sept. 5, 1989 |
| 4,909,464 | Levine, et al. | March 20, 1990 |
| 4,926,785 | Lamson | May 22, 1990 |
| 4,979,462 | Kramer, et al. | Dec. 25, 1990 |
| 5,092,556 | Darling, et al. | March 3, 1992 |

Most golf courses are provided with sprinkler systems positioned around the green in order to water the grass. After the golf course becomes operative, the tops of the sprinklers are generally flush with the ground and when the sprinkler is activated, a circular disk at the top of the unit is raised and a spray nozzle under the disk rotates and sprays water over a desired arc (generally 360 degrees), for a predetermined time and at predetermined intervals. Also, when the golf course is operative, normal maintenance equipment, such as lawn mowers, etc., can ride over the tops of the sprinkler units without damaging them.

However, when the golf course is undergoing construction, the sprinkler units are generally elevated slightly above the existing ground level and are not seated level with the ground until the course has been completed. During the construction of a golf course, heavy equipment could damage the sprinkler units if the equipment ran into or over them. Accordingly, it is standard practice to position flags adjacent to the sprinkler units so that the operators of heavy equipment can avoid the sprinkler units. These flags are generally 3 to 4 feet high and consist of a wire with a pennant fastened on the top of the wire with the bottom of the wire impelled in the ground adjacent to the sprinkler unit. However, the force of the water from the sprinkler unit itself can sometimes knock over the flag and occasionally the flag can be blown away by the wind.

The Darling patent, U.S. Pat. No. 5,092,556, which is listed above solves the problem described in the previous paragraph by providing a method of mounting the flag on the top of the sprinkler unit in such a way that it would be unaffected by the water from the sprinkler unit itself. However, once the golf course is constructed, the flag of the Darling patent has no other function.

The present invention improves on the Darling patent by providing a base attached to the sprinkler unit which allows the flag to be removed from the base once the golf course is constructed and yardage numbers to be inserted on the base which was previously employed for holding the flag.

The remaining above listed U.S. patents are not considered sufficiently pertinent to require further discussion.

3. Cross-Reference to Related Applications

This application constitutes an improvement over patent application 07/497,871 filed on Mar. 22, 1990, and now U.S. Pat. No. 5,092,556, for a "Flag Support System for Sprinkler Systems on Golf Courses" by the inventor of the present invention.

SUMMARY OF THE INVENTION

The present invention is an improved base support which attaches by means of a base to a top surface of a sprinkler unit of a sprinkler system installed on a golf course. During construction of the golf course when soil is below the top surface of the sprinkler unit, a flag wire with an attached flag is inserted into a flag holder insert which is attached to the base to alert equipment operators to the location of sprinkler units. When the golf course is completed, the flag holder insert is removed from the base and yardage indicating number inserts are installed onto the base.

The base is provided with two beveled base sides, two beveled base ends, a base top surface, a base bottom surface, a centrally located screw hole communicating with the base top and base bottom surfaces and through which a screw extends as a means of securing the base to the sprinkler unit, tapered ears on the base top surface near each of the two base ends, and base tracks on each of the two base sides.

The flag holder insert is provided with beveled flag holder insert sides, beveled flag holder insert ends, a flag holder insert top surface, a flag holder insert bottom surface, a median groove on the flag holder insert bottom surface running between the flag holder insert ends, and a tapered sleeve located on the flag holder insert top surface. The tapered sleeve is provided with an inner chamber which communicates with the flag holder insert bottom surface and an upper horizontal ledge of the sleeve.

A lower tapered portion of a two-tiered tapered plug inserts into the inner chamber with an upper tapered portion of the plug extending above the sleeve. A lower ledge of the plug, located where the lower and upper tapered portions attach to each other, rests on the upper ledge of the sleeve. The plug is provided with a bottom plug surface and a top plug surface. A centerhole in the plug communicates between the top and bottom plug surfaces. The flag wire, with the attached flag, inserts into the centerhole.

The beveled flag holder insert sides slide between the base tracks to removably secure the flag holder insert and attached flag to the base.

Once the flag holder insert is removed from the base, the number inserts are installed onto the base.

Each number insert has two beveled number insert sides, two beveled number ends, a number insert top surface, a number insert bottom surface, a numeral located on the number insert top surface, and a recessed hole located on the number insert bottom surface. The beveled number insert ends slide between the base tracks to secure the number inserts to the base. As the number inserts are slid onto the base, the tapered ears allow the number inserts to be slid over and past the ears. Once the number inserts are in place, the ears engage the recessed holes of the number inserts located adjacent to the base ends, thus preventing the number inserts from being removed from the base.

Brief Description of the Drawings

FIG. 1 is an elevation of a sprinkler unit slightly elevated above ground level and showing attached thereto an improved base support according to a preferred embodiment of the present invention with a base, and an attached flag holder insert and flag;

FIG. 2 is an enlarged perspective view of the improved base support illustrated in FIG. 1;

FIG. 3 is a perspective view of an improved base support according to a preferred embodiment of the present invention with the base and attached yardage indicating number inserts;

FIG. 4 is a top plan view of the base of the improved base support;

FIG. 5 is a cross-sectional view taken along line 5—5 of FIG. 4;

FIG. 6 is a side view taken along line 6—6 of FIG. 5;

FIG. 7 is a top plan view of the flag holder insert of the improved base support;

FIG. 8 is a cross-sectional view taken along line 8—8 of FIG. 7;

FIG. 9 is a side view of a two-tiered tapered plug of the improved base support;

FIG. 10 is a top plan view of FIG. 9 taken along line 10—10;

FIG. 13 is a top plan view of a yardage indicating number insert of the improved base support;

FIG. 14 is a cross-sectional view taken along line 14—14 of FIG. 13;

FIG. 15 is a side view taken along line 15—15 of FIG. 14;

DETAILED DESCRIPTION OF THE PREFERRED EMBODIMENTS

Figure 16:
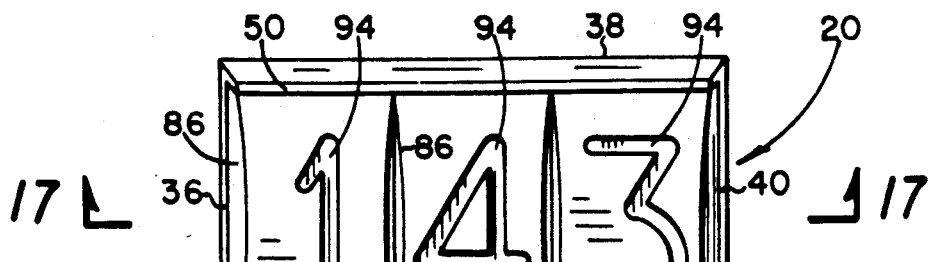
FIG. 16 is a top plan view showing the base and yardage indicating number inserts.

Referring to the drawings and initially to FIGS. 1 and 2, there is illustrated an improved base support 20 constructed in accordance with the preferred embodiment of the present invention. The improved base support 20 is shown attached to a top surface 22 of a sprinkler unit 24. The sprinkler unit 24 is part of a sprinkler system 26 installed on a golf course. The sprinkler unit 24 is shown with soil 28 at a level below the top surface 22 of the sprinkler unit 24 as might be the case during construction of the golf course. During construction of the golf course, a flag 30 can be supported on the improved base support 20 by means of a flag wire 32, the flag wire 32 having two ends, one end attaching to the flag 30 and the other end attaching to the improved base support 20.

After construction of the golf course is completed, the soil 28 is level with the top 22 of the sprinkler unit 24 and the improved base support 20 is retrofitted to accommodate yardage indicating number inserts 34 as illustrated in FIG. 3.

The improved base support 20 is provided with a base 36 which is shown in FIGS. 2 through 6. The base 36 has two base sides 38, two base ends 40, a base top surface 42, and a base bottom surface 44. The base sides 38 and the base ends 40 are beveled to resist impact by a golf ball or other object.

As illustrated in FIGS. 4, 5, 12 and 17, the base 36 is provided with a centrally located screw hole 46 through which a screw 48 inserts to secure the base bottom surface 44 to the top surface 22 of the sprinkler unit 24.

The two base sides 38 are provided with upward-oriented base tracks 50 which are slanted toward each other so that the base tracks 50 are closest together at their uppermost extensions. As best shown in FIGS. 4 and 6, the tracks 50 constitute a longitudinal recess or slide.

The base top surface 42 is provided with two upward-projecting tapered ears 52 located on either side of the screw hole 46 between the screw hole 46 and the two base ends 40. Each ear 52 is tapered with a lower side located adjacent to the base end 40 and a higher side located adjacent to the screw hole 46.

During construction of the golf course, a flag holder insert 54 can be installed on the base 36.

As illustrated in FIGS. 7 and 8, the flag holder insert 54 is provided with two flag holder insert sides 56, two flag holder insert ends 58, a flag holder insert top surface 60 and a flag holder insert bottom surface 62. The flag holder insert sides 56 are beveled so they can slide in the recess between the base tracks 50, thus removably securing the flag holder insert 54 to the base 36. The flag holder insert bottom surface 62 is provided with a median groove 64 which extends between the flag holder insert ends 58 and allows the flag holder insert 54 to slide over the ears 52 without engaging the ears 52, thus allowing the flag holder insert 54 to be slid onto and removed from the base 36. The flag holder insert ends 58 are beveled to resist impact by a golf ball or other object.

The flag holder insert top surface 60 is provided with a centrally located upward extending tapered sleeve 66. The sleeve 66 has a tapered inner chamber 68 which communicates with the insert bottom surface 62. The inner chamber 68 of the sleeve 66 terminates upwardly at an upper horizontal ledge 70.

Figure 11:
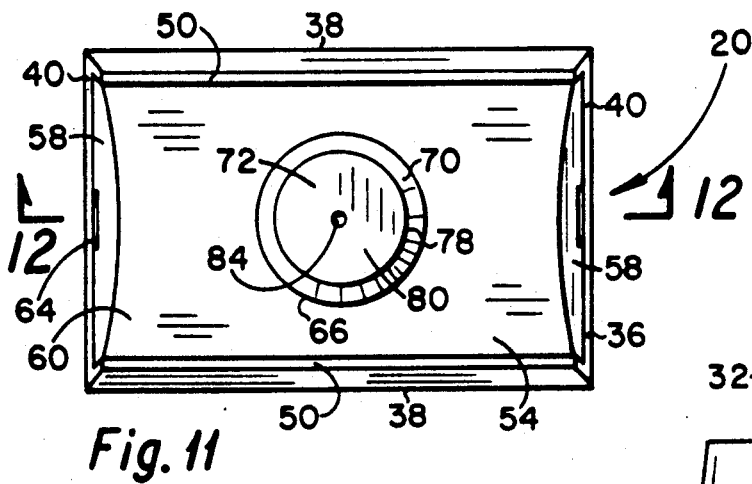
FIG. 11 is a top plan view of the base, the flag holder insert and the two-tiered tapered plug.
Figure 12:
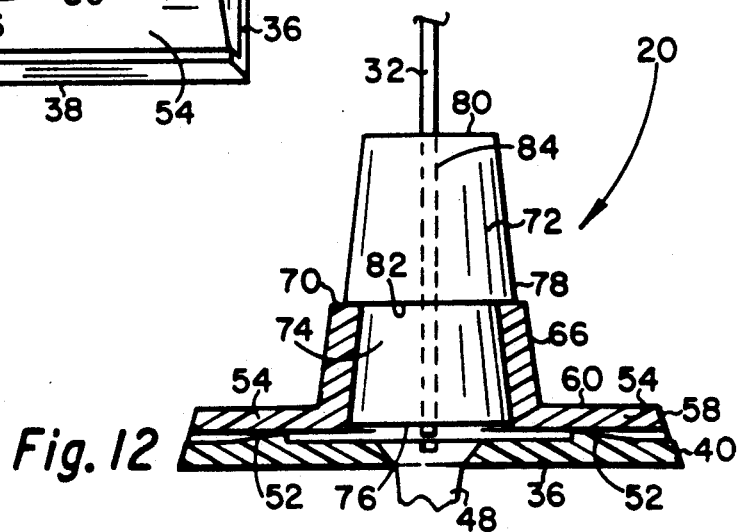
FIG. 12 is a cross-sectional view taken along line 12—12 of FIG. 11.

As shown in FIGS. 2, 11 and 12, a one-piece, two-tiered tapered plug 72 inserts into the inner chamber 68. The plug 72, shown in FIGS. 9 and 10, is provided with a lower tapered portion 74 having a bottom plug surface 76. The plug 72 is also provided with an upper tapered portion 78 having a top plug surface 80. The plug 72 forms a lower horizontal ledge 82 where the upper tapered portion 78 connects to the lower tapered portion 74.

The lower tapered portion 74 inserts into the inner chamber 68 with the lower ledge 82 resting against the upper ledge 70 and the bottom plug surface 76 approximately flush with the flag holder insert bottom surface 62.

The plug 72 has a center hole 84 extending from the top plug surface 80 to the bottom plug surface 76. The flag wire 32 inserts into the center hole 84, thus securing the flag 30 to the improved base support 20.

After the golf course is constructed, the flag insert holder 54 can be removed from the base 36 by sliding the insert holder 54 toward either of the base ends 40. Once the flag holder insert 54 is removed, it can be replaced with number or yardage marker inserts 34 bearing numerals 94 which can be used to indicate yardage on the golf course.

Each number or yardage marker insert 34, as shown in FIGS. 13 through 15, has two number insert sides 86, two number insert ends 88, a number insert top surface 90, and a number insert bottom surface 92. Each number insert 34 is provided with one numeral 94, between 0 and 9 inclusive, which is engraved, laminated, embossed, or otherwise affixed to the number insert top surface 90. The number insert ends 88 are beveled so they can slide between and be secured by the base tracks 50. The number insert sides 86 of the number insert 34 are beveled to resist impact of a golf ball or other object.

The number insert bottom surface 92 of the number insert 34 is provided with a central recessed hole 96 engagable by the tapered ears 52 to lock the number inserts 34 onto the base 36.

Figure 17:
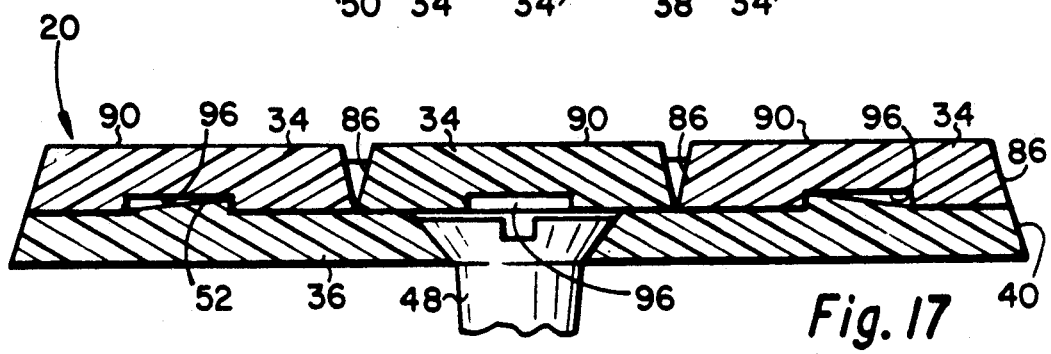
FIG. 17 is a cross-sectional view taken along line 17—17 of FIG. 16.

Referring to FIGS. 16 and 17, as the number inserts 34 are slid onto the base 36, the tapered ears 52 engage the central recessed hole 96 in the number inserts 34, thus preventing the number inserts 34 from moving in the opposite direction, i.e. the direction to remove the number inserts 34. A first number insert 34 can be slid past the ear 52 and can be held captive between two number inserts 34 positioned on either side of the first one. The two number inserts 34 on either side of the first one are prevented from moving in the direction to remove the number inserts 34 by the ears 52 which engage the central recess holes 96 therein.

Whereas, the present invention has been described in terms of the specific structure described above, it should be understood that other and further modifications, apart from those shown or suggested herein, may be made within the spirit and scope of this invention.

What is claimed is:

1. An improved base support for alternately securing a flag and yardage marker inserts to a water sprinkler unit installed on a golf course comprising:
   a base, means for attaching the base to the water sprinkler unit, the base being provided with a longitudinal recess,
   a flag holder insert being slidably and removably received in the longitudinal recess in the base, the flag holder insert being provided with a means for securing a flag thereto,
   a plurality of yardage marker inserts being provided with numerals on top surfaces thereof, the yardage marker inserts being slidably received in the longitudinal recess in the base when the flag holder insert is removed from the recess.

2. An improved base support according to claim 1 further comprising:
   the base being provided with a screw hole, a screw inserted through the screw hole to secure the base to the sprinkler unit.

3. An improved base support according to claim 1 further comprising:
   the recess being formed by base tracks provided on each of two base sides located on the base, the flag holder insert being provided with beveled sides which slide between the base tracks to removably secure the flag holder insert to the base,
   tapered ears being provided on the base, a median groove being provided in a bottom surface located on the flag holder insert so that said median groove allows the flag holder insert to slide over the ears without engaging the ears.

4. An improved base support according to claim 3 further comprising:
   the flag holder insert being provided with a sleeve having an inner chamber, a plug inserting in the inner chamber, the plug being provided with a centerhole, a flag wire with two ends having one end attached to the flag and having the other end inserted in the centerhole.

5. An improved base support according to claim 3 further comprising:
   the yardage marker inserts being provided with beveled ends which slide between the base tracks to secure the yardage marker inserts to the base after the flag holder insert is removed from the base.

6. An improved base support according to claim 5 further comprising:
   recessed holes on insert bottom surfaces located on the yardage marker inserts, tapered ears being provided on a top surface located on the base, the ears engaging the recessed holes allowing the yardage marker inserts to be slid onto the base but preventing removal of the yardage marker inserts from the base.

* * * * *